(12) United States Patent
Eagen

(10) Patent No.: US 9,429,241 B2
(45) Date of Patent: Aug. 30, 2016

(54) ENERGIZED PACKING RETAINER

(71) Applicant: Array Holdings, Inc., Houston, TX (US)

(72) Inventor: Duane M. Eagen, Norman, OK (US)

(73) Assignee: Safoco, Inc., Houston, TX (US)

( * ) Notice: Subject to any disclaimer, the term of this patent is extended or adjusted under 35 U.S.C. 154(b) by 0 days.

(21) Appl. No.: 13/649,424

(22) Filed: Oct. 11, 2012

(65) Prior Publication Data

US 2014/0102575 A1    Apr. 17, 2014

(51) Int. Cl.
*F16K 5/06* (2006.01)
*G01M 3/28* (2006.01)
*F16K 37/00* (2006.01)

(52) U.S. Cl.
CPC .......... *F16K 5/0689* (2013.01); *F16K 5/0647* (2013.01); *F16K 37/0083* (2013.01); *G01M 3/2876* (2013.01); *Y10T 29/49405* (2015.01); *Y10T 137/87724* (2015.04)

(58) Field of Classification Search
CPC .. F16K 5/0663; F16K 5/0668; F16K 5/0673; F16K 5/0689

USPC ................ 137/312; 251/315.08, 315.09, 289
See application file for complete search history.

(56) References Cited

U.S. PATENT DOCUMENTS

| 3,384,337 | A | * | 5/1968 | Brown | 251/172 |
| 3,705,707 | A | * | 12/1972 | Scaramucci | 251/84 |
| 3,737,145 | A | * | 6/1973 | Heller et al. | 251/309 |
| 4,232,709 | A | * | 11/1980 | Zoric | 137/625.47 |
| 4,345,738 | A | * | 8/1982 | Ripert | 251/315.01 |
| 4,634,098 | A | * | 1/1987 | Varden | 251/188 |
| 4,662,831 | A | * | 5/1987 | Bennett | 417/430 |
| 5,263,682 | A | * | 11/1993 | Covert et al. | 251/214 |
| 6,129,336 | A | * | 10/2000 | Sandling et al. | 251/214 |
| 6,550,495 | B1 | * | 4/2003 | Schulze | 137/614.2 |
| 6,874,757 | B2 | * | 4/2005 | Hallett | 251/292 |
| 7,806,175 | B2 | * | 10/2010 | Hickie | 166/75.13 |
| 7,896,312 | B2 | * | 3/2011 | Dalmasso et al. | 251/316 |

* cited by examiner

*Primary Examiner* — Craig Schneider
*Assistant Examiner* — Kevin Barss
(74) *Attorney, Agent, or Firm* — Bushman Werner, P.C.

(57) ABSTRACT

Disclosed herein is a dual packing retainer and dual sealing ball valve for use generally in high pressure applications. Further disclosed herein are methods of detecting seal failure before the ball valve must be taken offline due to the presence of secondary or backup seals.

10 Claims, 3 Drawing Sheets

ENERGIZED PACKING RETAINER

FIELD

The invention relates to methods of developing improved ball valves which can be used in the petroleum industry, for example in the hydraulic fracturing industry. In particular the invention relates to detection of defects in ball valves and the ability to easily repair ball valves in the field.

BACKGROUND

Ball valves are known in the art, and have traditionally been used as an effective mechanism for regulating fluid flow in various conduits. Typically, ball valves are employed to open or close to enable or block a flow of fluid in a variety of applications. Various structural arrangements have been achieved for interrupting fluid flow by twisting a handle of a ball valve, and resuming fluid flow by twisting the handle back again. Ball valves commonly include a body, an adapter, a rotatable ball disposed within the body and adapter, and a stem coupled to the ball. Typically, ball valves include a housing having an inlet port and an outlet port. A throughbore internally connects the inlet port to the outlet port. An inlet conduit and an outlet conduit may be connected to the inlet port and the outlet port respectively. A central chamber is positioned in the path of the throughbore. A ball with a throughbore is positioned within the central chamber. A ball valve is a quarter turn valve. The ball may be rotated by an external handle. When the handle is twisted to align the throughbore of the ball with the path of the throughbore connecting the inlet port and outlet port, the throughbore connecting the ports is uninterrupted and fluid may flow between the inlet and outlet ports. When the handle is twisted so that the throughbore of the ball lies perpendicular to the throughbore connecting the ports, fluid flow is interrupted.

Those skilled in the art will realize that ball valves are generally considered not to be functional for oil and gas operations due to the pressures in the conduits or lines, contaminants, and/or the like. The fluid produced from many geological formations contains minute, abrasive particles, such as sand, which lodge between the ball and seat and wear away the valve components. Over a period of time, the rotational ability of prior art valves may be reduced, thus requiring higher torque to turn such a valve. In some wells, where the production fluid is particularly sandy or corrosive, these ball valves may be particularly prone to a decrease in rotational ability.

A particular type of ball valve that may be used in certain higher pressure applications incorporates a trunnion ball which has additional mechanical anchoring of the ball at the top and bottom. One particular advantage of a ball valve incorporating a ball and trunnion mechanism is that when spaced in the same longitudinal axis, the trunnions can act to prevent drift upwards or downwards within the ball valve casing by providing a balancing mechanism.

In applications involving ball valves subjected to high pressure, or corrosive or other environments lending to stuck valves, it would be desirable to increase the torque applied to such valves in order to achieve rotation of the ball.

Additionally, in oil and gas development or operations, time is money. The longer it takes to perform a task the more money that is being spent. Currently in many high-pressure petroleum applications gate valves are used which require a hand wheel to open and/or close the gate valve. Workers in such fields may often open and close gate valves under high pressures of greater than 5,000 psi. Often the time required to open and/or close the gate valve is in the range of 7-60 minutes due to the number of hand wheel turns required to open and/or close the gate valve. The art field is in need of a valve that can be opened and/or closed in a shorter amount of time.

Further, in high pressure applications, a ball valve is more likely to leak or break down. It would therefore be helpful and useful to have a pre-breakdown indicator and better sealing of packing retainers around the turnwheel or turnwheels of ball valves. Such implements in high pressure ball valves would save time by indicating when a ball valve was about to fail and would provide relatively quick repairs in the field that would result in less financial loss.

SUMMARY

Certain embodiments of the invention disclosed herein pertain to a ball valve comprising: a ball valve body having a first valve bore and a second valve bore; a ball situated within the ball valve body, said ball comprising a throughbore defining a flow axis; a first trunnion bonnet with a proximal end oriented toward the ball and a distal end oriented away from the ball, the trunnion bonnet further defining a trunnion axis perpendicular to the flow axis; an outer packing retainer having a proximal end and a distal end, the outer packing retainer adapted to be received by the first trunnion bonnet; and an inner packing retainer having a proximal end and a distal end, the inner packing retainer adapted to be received by the outer packing retainer. Still further the embodiment may comprise: a first sealing system between the proximal end of the trunnion bonnet and positioned proximally to the first packing retainer; a second sealing system between the proximal end of the outer packing retainer and the proximal end of the inner packing retainer; and a trunnion with a proximal end abutting the ball and extending distally from the ball through each of the trunnion bonnet, the first sealing system, the outer packing retainer, the second sealing system and the inner packing retainer, the trunnion further having a distal end connected to a turnwheel. In such embodiments the first sealing system may prevent fluid from escaping from the ball valve, such that if the first sealing system fails, the second sealing system prevents fluid from escaping from the ball valve.

Still further, in certain embodiments, the ball valve has, on the opposite side of the ball and aligned with the trunnion axis, another trunnion bonnet, another outer packing retainer, another inner packing retainer, another first sealing system, another second sealing system, another trunnion and another turnwheel.

In further embodiments concerning the outer packing retainer, the outer packing retainer may comprise a weep bore distal to the first sealing system and proximal to the second sealing system, the weep bore traversing an interior area of the outer packing retainer to outside the ball valve. In such embodiments, the weep bore may be a diameter of 0.5 mm, 1 mm, 2 mm, 3 mm, 4 mm, 5 mm, 6 mm, 7 mm, 8 mm, 9 mm, 10 mm or more depending on the viscosity of the fluid flowing through the ball valve. In such embodiments, typically if the first sealing system fails, less than 1% of the fluid flowing through the ball valve or stopped by the ball valve escapes through the weep bore. In certain further embodiments, in addition to a weep bore, the outer packing retainer comprises a weep notch facing the trunnion axis and wherein the weep notch is fluidly connected to the weep bore.

In embodiments concerning the sealing systems, often the first sealing system comprises a u-pack seal and a polypack seal. Further, the second sealing system often comprises two polypack seals.

In certain embodiments concerning the connection between the packing retainers and the trunnion bonnet, the outer packing retainer may be threaded into the trunnion bonnet. Likewise, the inner packing retainer may be threaded into the outer packing retainer.

In embodiments concerning the trunnion, in certain configurations of the ball valve, the distal end of the trunnion passes through a ball valve yoke.

In embodiments related to the turnwheel or turnwheels of the ball valve, in certain instances, one or more turnwheel is an impact turnwheel.

In other aspects of the invention, within the valve body, the ball may rest on two ball valve seats with throughbores positioned on opposite sides of the ball and aligned with the flow axis. Still further, the ball seat may possess ball valve seat seals aligned with the flow axis.

Other embodiments pertain to a method of using any of the aforementioned embodiments of ball valves to detect a seal leak failure. In such embodiments, the method may comprise, after obtaining one of the aforementioned ball valves, installing an outer packing retainer with a weep notch in fluid connection to a weep bore, the weep notch positioned between the first sealing system and the second sealing system, and the weep bore exiting the trunnion bonnet; attaching a pipe to the first valve bore and the second valve bore; pushing a fluid under a pressure greater than atmospheric pressure through the throughbore such that if fluid is leaking from the weep bore, the first sealing system has failed.

In such methods, if the second sealing system is still intact, this will prevent ball valve packing retainer failure. However, when fluid is leaking from the weep bore, this indicates that the ball valve may only be operated for a limited time before seal replacement. Depending on the seal types used in the second sealing system and the pressure of the fluid flowing through the ball valve, the amount of time may be 10 minutes, 20 minutes, 30 minutes, 40 minutes, 50 minutes, 1 to 24 hours, 1 to 5 days or some increment therein.

In further methods of detecting a sealing system failure, if fluid is leaking from the inner packing retainer, this indicates both the first sealing system and the second sealing system have failed and the ball valve should be taken offline.

When the ball valve is taken offline to replace the first sealing system, the method in this embodiment may comprise: closing off the ball valve to fluid pressure; removing the handwheel from the distal end of the trunnion; unscrewing the inner packing retainer and removing the inner packing retainer from the trunnion by sliding the inner packing retainer in a distal direction until the inner packing retainer disassociates from the trunnion; unscrewing the outer packing retainer and removing the outer packing retainer from the trunnion by sliding the outer packing retainer in a distal direction until the outer packing retainer disassociates from the trunnion; removing the first sealing system and replacing the first sealing system with new seals; and repeating the steps in reverse to reinstall the packing retainers and make the ball valve operational.

Still further, another embodiment of the invention comprises a system itself comprising an inlet conduit affixed to the first valve bore of the ball valve of the aforementioned embodiments and an outlet conduit affixed to the second valve bore in a fracking operation for changing a pressure of a fluid flowing from the inlet conduit, through the valve and to the outlet conduit; wherein the pressure of the fluid flowing though the outlet conduit is changed from 0 psi to the about the same pressure of the fluid flowing from the inlet conduit or vice versa.

Figure 1:
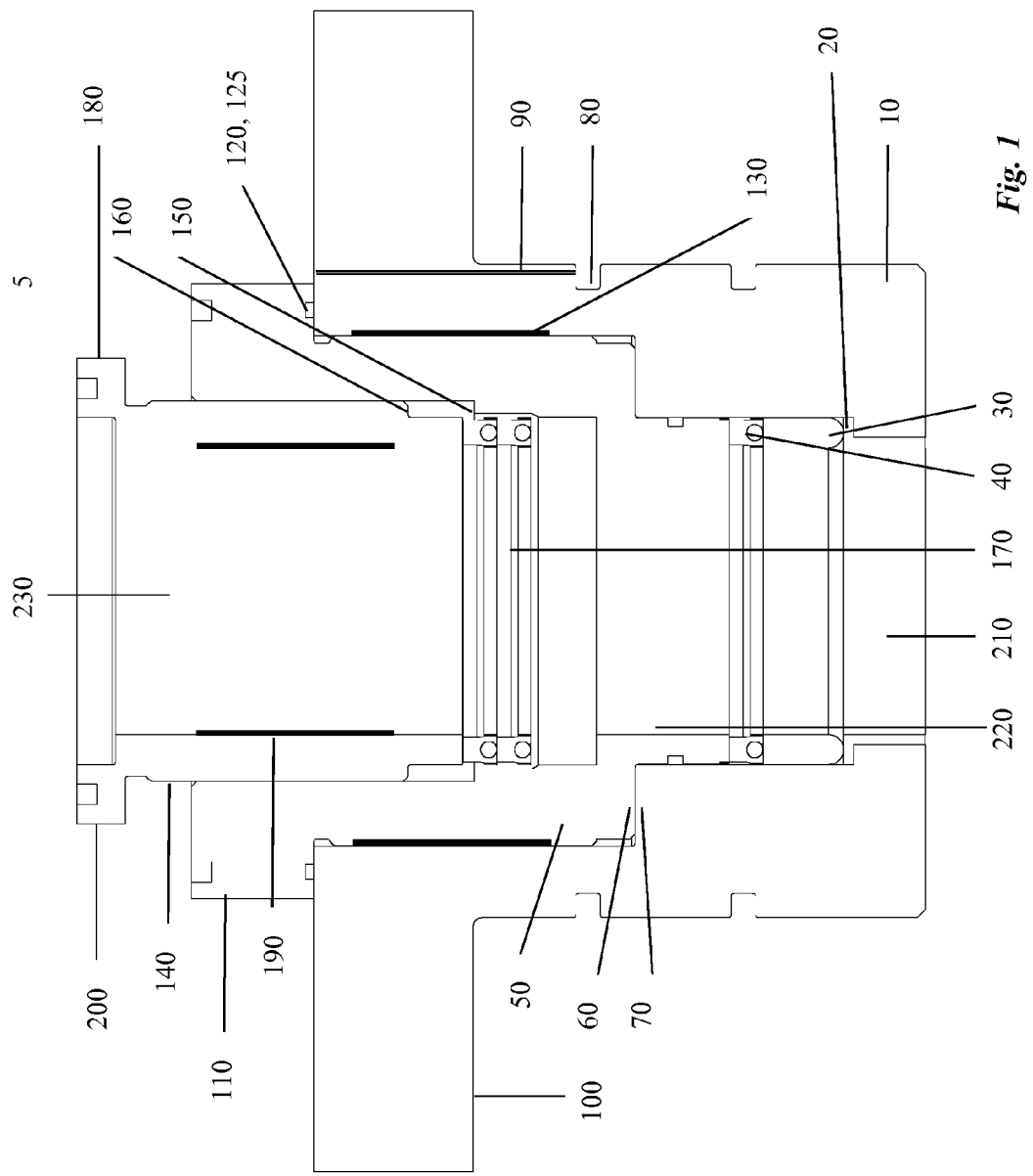
FIG. 1 is a cross sectional illustration of the trunnion bonnet and packing retainer configuration of the present invention.

LIST OF REFERENCE NUMERALS trunnion bonnet and packing retainer configuration 5
trunnion bonnet 10
trunnion bonnet seal ledge 20
trunnion bonnet u-pack seal 30
trunnion bonnet polypack seal 40
proximal end of the outer packing retainer 50
packing retainer support 60
packing retainer ledge 70
weep notch 80
weep bore 90
trunnion bonnet distal lip 100
outer packing retainer distal lip 110
distal lip sealing groove 120
distal lip seal 125
outer packing retainer threading 130
inner packing retainer 140
inner packing retainer support 150
inner packing retainer ledge 160
inner packing retainer seals 170
inner packing retainer distal lip 180
inner packing retainer threading 190
flat edges 200
trunnion bore 210
retainer trunnion bore 220
inner retainer trunnion bore 230
ball valve body 240
ball 250
trunnion 260
trunnion wedge 265
ball valve seats 280
throughbore 290
ball valve seat sealing grooves 295
ball valve seat seals 300
threaded bores 320
pipe flanges 330
ball valve yoke 340
roller bearings 345
end cap 350
hammer 360
strike zone 370
Yoke Arms 380
yoke mounting plate 390
flow axis 400

DETAILED DESCRIPTION

Introduction

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings making apparent to those skilled in the art how the several forms of the invention may be embodied in practice.

The following definitions and explanations are meant and intended to be controlling in any future construction unless clearly and unambiguously modified in the following examples or when application of the meaning renders any construction meaningless or essentially meaningless. In cases where the construction of the term would render it meaningless or essentially meaningless, the definition should be taken from Webster's Dictionary $3^{rd}$ Edition.

As used herein, the term "conduit" means and refers to a fluid flow path.

As used herein, the term "line" means and refers to a fluid flow path.

As used herein, the term "fluid" refers to a non-solid material such as a gas, a liquid or a colloidal suspension capable of being transported through a pipe, line or conduit. Examples of fluids include by way of non-limiting examples the following: natural gas, propane, butane, gasoline, crude oil, mud, water, nitrogen, sulfuric acid and the like.

As used herein, the term "attached," or any conjugation thereof describes and refers to the at least partial connection of two items.

As used herein, the term "stem" refers to a ball valve stem comprising a plurality of sections.

As used herein, the term "stem shaft" refers to a section of stem comprising seal grooves used to contain pressure and fluid being processed through the valve.

As used herein, the term "proximal" refers to a direction toward the center of the ball valve.

As used herein, the term "distal" refers to a direction away from the center of the ball valve.

As used herein, the term "polypack," or any conjugation thereof may refer to multi-purpose seals that are molded, multi-purpose sealing devices combining an O-Ring type O-spring with a conventional lip seal.

Stainless steel, in certain instances, can be defined as any iron alloy generally resistant to oxidation.

Hydraulic, in certain instances, can be defined as a fluid which can be placed under pressure in order to move parts of mechanical devices. Examples of hydraulic fluids include, but are not limited to water, oils, colloidal suspensions, alcohols and the like. Commercially available hydraulic fluids are readily available.

Embodiments

It is an embodiment of the invention to provide a ball valve with increased detection for sealing leaks. In such embodiments, a user of the ball valve would be able to detect fluid from the ball or throughbore such as gases or petrochemical fluids traveling from one area to another via a ball valve. In such embodiments, an open weep bore may be used to provide a small amount of leakage which may drip from the ball valve.

In other embodiments, in lieu of an open weep bore used to provide a small amount of leakage dripping from the ball valve, a sealed piston may be used such that when a ball valve seal is broken; pressure pushes the sealed piston outward from the packing retainer to deliver compressed air to a pressure gauge.

In still other embodiments, in lieu of an open weep bore, a pressure gauge capable of accepting a pressurized petrochemical gas, liquid, colloidal suspension or a combination thereof may be attached to the weep bore in order to indicate a seal leak within a packing retainer of the ball valve.

In further embodiments concerning a weep bore, a fluid detection device electronically connected to an audible or visible alarm or a combination thereof, may be in fluid communication with the weep bore. In this embodiment, when the weep bore fills with fluid such as oil traversing through the throughbore, an alarm indicating seal failure will sound or be visible.

Other embodiments of the invention concern methods of sealing a ball valve through the use of seals and a single packing retainer system. In certain embodiments a packing retainer exists with one or more seals proximal to the packing retainer and distal to a trunnion bonnet seal ledge. In certain further embodiments, two seals are used. In such embodiments, the seals may be polypack seals, u packing seals or a combination thereof. In specific embodiments, a u-packing seal is proximal to a polypack seal. In other embodiments, the seals are made of Viton, rubber, nylon and the like or a combination thereof.

Still further, in inventions concerning a single packing retainer, there is a weep notch distal to the one or more seals. In such embodiments, if the seal or seals fail, fluid may enter the weep notch which is fluidly connected to the weep bore.

In other embodiments, a weep notch is not present and the small space between the trunnion bonnet and the packing retainer allows fluid to travel from the failed seal or seals to the weep bore.

In embodiments concerning a single packing retainer and a trunnion bonnet, the trunnion bonnet is positioned outward with respect to the packing retainer and at least partially proximal to the single packing retainer with a packing retainer support being distal to a packing retainer ledge of the bonnet.

In further embodiments concerning a single packing retainer and a trunnion bonnet, the trunnion bonnet has a trunnion bore centered within the bonnet. Likewise, the single packing retainer has a retainer trunnion bore centered within the packing retainer and aligned with the trunnion bore of the trunnion bonnet.

In other embodiments concerning the packing retainer, there are two packing retainers with the aforementioned single packing retainer being the outer packing retainer and the second packing retainer being the inner packing retainer.

In such embodiments, wherein there are two packing retainers, the outer packing retainer is adapted to receive the inner packing retainer. Further, the outer packing retainer may comprise an inner packing retainer ledge.

In further embodiments, wherein the outer packing retainer comprises an inner packing retainer ledge, one or more proximal inner packing retainer seals may be distal to the inner packing retainer ledge and proximal to the proximal end of the inner packing retainer.

In such embodiments further comprising the inner packing retainer, the inner packing retainer has an inner packing retainer trunnion bore which is designed to accept a trunnion and is aligned with the retainer trunnion bore and the bonnet trunnion bore.

In certain further embodiments concerning the outer packing retainer, the packing retainer may have inner packing retainer threading which is threaded on its inward facing wall and adapted to receive the inner packing retainer which would be reciprocally threaded in its inward facing wall.

Likewise, in certain embodiments, the trunnion bonnet may have outer packing retainer threading which is threaded on its inward facing wall and adapted to receive the outer packing retainer which would be reciprocally threaded in its inward facing wall.

In still further embodiments the outer packing retainer may have an outer packing retainer distal lip and the inner packing retainer have an inner packing retainer distal lip. The trunnion bonnet distal lip provides and anchorage for a ball valve yoke and typically abuts the proximal side of the outer packing retainer distal lip. The proximal side of the inner packing retainer distal lip abuts the distal side of the outer packing retainer distal lip in some embodiments.

In certain embodiments regarding the outer packing retainer distal lip, the proximal side has a distal lip sealing groove which circumscribes the proximal side of the outer packing retainer distal lip. Further, the distal lip sealing groove may contain a distal lip seal such as a polypack seal or an O-ring such as a rubber O-ring or a Viton O-ring.

In certain embodiments, regarding the inner packing retainer and the outer packing retainer, and especially applicable wherein the inner packing retainer and the outer packing retainer are threaded, the outer packing retainer distal lip and the inner packing retainer distal lip may have flat retainer lip edges on their outward wall in order to receive a wrench or other tool to facilitate installation or removal of the packing retainers.

In certain embodiments regarding the trunnion bonnet has an outward wall facing an inward wall of the valve body which is adapted to receive the trunnion bonnet. Like the packing retainers, the inward wall of the valve body may be threaded and adapted to receive reciprocal threading on the outward wall of the trunnion bonnet. In alternative embodiments, the trunnion bonnet may be bolted to the valve body. Thus, the outward wall of the trunnion bonnet abuts the distal portion of the inward facing portion of the valve body.

In certain further embodiments regarding the trunnion bonnet, the trunnion bonnet may have one or more trunnion bonnet sealing grooves. The bonnet sealing grooves may be adapted to receive trunnion bonnet seals.

Further, regarding the trunnion bonnet, the trunnion bonnet may abut the ball of the ball valve in a direction perpendicular to the throughbore or flow axis.

In embodiments regarding the trunnion, the trunnion may comprise a wedge facing an outward direction at its most distal end. Likewise, the ball of the ball valve may comprise a trunnion notch with a distal edge facing inward at its most distal end, the notch being adapted to receive the wedge. In still other embodiments, the trunnion is affixed to the ball by being casted with the bore or forged with the bore.

In certain embodiments regarding the ball valve, the ball is positioned within the valve wherein it abuts ball valve seats. The ball valve seats may be parallel to the throughbore or at least partially comprise the throughbore such that fluid flows through the throughbore portion of the ball valve seats and into the ball valve. In typical embodiments, in high pressure applications, the ball valve seats, the ball valve an the ball valve body are made of high strength durable metal such as stainless steel, tungsten, titanium, or any metal or alloy capable of withstanding high pressures such as 20,000 p.s.i. In some embodiments, the ball valve may additionally have ball valve seat sealing grooves circumscribing the throughbore and oriented in a distal direction. These grooves may be adapted to receive ball seat seals such as O-rings or polypack seals.

Regarding embodiments discussing the ball valve body, distal to the ball valve seats may be the ball valve body. The ball valve body may comprise two throughbore areas such that when aligned with the ball, fluid may flow through the ball, the seat bores and through the valve body throughbores to pipe. In many embodiments the ball valve body is made of a single piece of metal, into which the ball valve seats and the ball are installed. In other embodiments, the ball valve body is made of two or more pieces which are bolted or welded together after installation of the ball valve and the ball valve seats. The distal side of the ball valve body may have threaded bores adapted to receive threaded bolts such that pipe flanges may be bolted to the valve body.

In certain embodiments, perpendicular to the threaded bores adapted to receive bolts for flange attachment are yoke receiving threaded bores adapted to receive bolts securing one or more yoke to the valve body.

Regarding yokes, in most embodiments, the trunnion extends from its proximal end at the ball valve through the trunnion bonnet and packing retainers and through the yoke bore, wherein the distal end of the trunnion is attached to a turnwheel. Further regarding yokes, in certain embodiments, to facilitate rotation of the trunnion by the turnwheel and subsequent rotation of the ball valve, roller bearings may be placed within the yoke bore. In other embodiments, the distance from the proximal end of the trunnion to the distal end of the trunnion is less of that what is needed for support by a yoke. In such embodiments a yoke may not be used.

In further embodiments of the invention concerning the turnwheel, the distal end of the trunnion is attached to a turnwheel. In such embodiments, the turnwheel may be attached to the trunnion by pinning or through the use of an end cap such as an end cap with internal threading adapted to receive external threading from the distal end of the trunnion.

In many embodiments, the ball valve has trunnion bonnets, packing retainers, trunnions, yokes and turnwheels on opposite sides of the ball and perpendicular to the flow axis. In other embodiments, the configuration is monopolar instead of bipolar.

In embodiments concerning the turnwheel, the turnwheel may be any type of turnwheel. In preferred embodiments, the turnwheel or turnwheels are impact turnwheels.

In certain other embodiments, an impactor turn wheel is employed to provide torque to rotate the ball within the ball valve. In such embodiments, when only one impactor turn wheel is employed, a trunnion type ball valve may or may not be used. In lieu of a trunnion type ball valve, a floating ball valve with a valve stem may be employed when only one impactor turn wheel is employed.

An impactor turn wheel has an impact target that is directly functionally attached to the trunnion. The turn wheel pushes against the impact target to apply the torque. After the valve has been closed to a partial-tight position, the turn wheel is backed off a bit ($<\frac{1}{2}$ turn, typically) but the impact target stays in position (i.e. valve remains partially closed). The turn wheel is then spun quickly in the closing direction so that is 'impacts' the impact target providing the much higher torque required to properly seat the valve. In large or high pressure valves, it may take several men to apply the torque required with a standard turn wheel. With the impact turn wheel, the instantaneous torque applied when the turn wheel strikes the impact target can be as much 10 times greater than one person could apply with a standard turn wheel.

The series of turns can be reversed to move the ball valve in the opposite direction.

In certain embodiments, the impact turn wheel may have a single impact target such that the turn wheel can be rotated nearly 360 degrees before striking the impact target. In other embodiments, the impact turn wheel may have two impact targets located 180 degrees from each other such that the turn wheel can be rotated nearly 180 degrees before striking the impact target. Alternative embodiments exist with a higher number of impact targets wherein the impact targets are spaced at equidistant angles from each other around the valve stem.

Now, referring to FIG. 1, which is a cross sectional illustration of the trunnion bonnet and packing retainer configuration 5 of the present invention, the trunnion bonnet 10 is the most proximal part of the configuration. The trunnion bonnet 10 rests upon the valve body (not shown) at the most proximal end of the trunnion bonnet. Immediately distal the proximal end of the trunnion bonnet 10 is a trunnion bonnet seal ledge 20. Resting on the distal side of the trunnion bonnet seal ledge 20 is a plurality of seals. In the configuration shown in FIG. 1, a trunnion bonnet u-pack seal 30 is the most proximal seal, followed immediately distally by a trunnion bonnet polypack seal 40. Retaining the trunnion bonnet u-pack seal 30 and the trunnion bonnet polypack seal 40 is the proximal end of the outer packing retainer 50. The outer packing retainer 50 possesses a packing retainer support 60 with a proximal facing side which rests on a packing retainer ledge 70, preventing unwanted distal movement of the outer packing retainer 50 which might otherwise deform the trunnion bonnet polypack seal 40 and the trunnion bonnet u-pack seal 30. Immediately distal to the proximal end of the outer packing retainer 50 is a weep notch 80, which allows minute flow of fluid through a weep bore 90 in the trunnion bonnet to the outside as an indication of failure of either or both of the trunnion bonnet polypack seal 40 and the trunnion bonnet u-pack seal 30. This feature allows an operator to detect the start of failure and know that the seals of the packing retainer will soon need replacement without experiencing total failure of all the seals of the trunnion bonnet and packing retainer configuration 5.

Additionally, and still referring to FIG. 1, at the distal end of the trunnion bonnet 10 is a trunnion bonnet distal lip 100. The distal side of the trunnion bonnet distal lip 100 abuts the outer packing retainer distal lip 110. Distal to the trunnion bonnet distal lip 100 and proximal to the outer packing retainer distal lip is a distal lip sealing groove 120 which circumscribes the outer packing retainer distal lip 110. Seated within the distal lip sealing groove is a distal lip seal 125.

To secure the outer packing retainer 50 to the trunnion bonnet 10, as can be seen in FIG. 1, the outer packing retainer 50 has outer packing retainer threading 130, adapted to be received by the trunnion bonnet by reciprocal threading, such that the outer packing retainer 50 is screwed into the trunnion bonnet 10.

Situated inwardly from the outer packing retainer 50, is the inner packing retainer 140. Like the outer packing retainer 50. The inner packing retainer 140 has supports to prevent unwanted proximal movement past a certain point. Towards this end, near the proximal end of the inner packing retainer 140 is an inner packing retainer support 150. The proximal edge of the inner packing retainer support abuts the distal side of an inner packing retainer ledge 160 located on the inward wall of the outer packing retainer. Further, as illustrated in FIG. 1, near the proximal end of the inner packing retainer are inner packing retainer seals 170, which are typically polypack seals. Similar to the outer packing retainer distal lip 110, the inner packing retainer has an inner packing retainer distal lip 180 at its distal end. When fully inserted into the outer packing retainer 50, the inner packing retainer distal lip 180 of the inner packing retainer 140 has a proximal edge which abuts the distal edge of the outer packing retainer distal lip 110.

Still further, outward wall of the inner packing retainer 140 possesses inner packing retainer threading 190 adapted to be received by reciprocal threading in the inward wall of the outer packing retainer 50. To remove the inner packing retainer 140 and optionally the outer packing retainer 50 from the trunnion bonnet 10, the outward wall of the outer packing retainer distal lip 110 and the outward wall of the inner packing retainer distal lip 180 generally possess flat edges 200 as are typically found on machine nuts, such that a wrench may be applied to either packing retainer to remove the desired packing retainer.

Running through the trunnion bonnet 10, the outer packing retainer 50 and the inner packing retainer 140 is a trunnion bore 210. Immediately distal to the trunnion bore is a retainer trunnion bore 220, and immediately distal to the retainer trunnion bore is an inner retainer trunnion bore 230. The bores are in alignment such that a trunnion (not shown) from the ball valve may exit the ball valve body and extend through the trunnion bonnet and packing retainer configuration 5.

Figure 2:
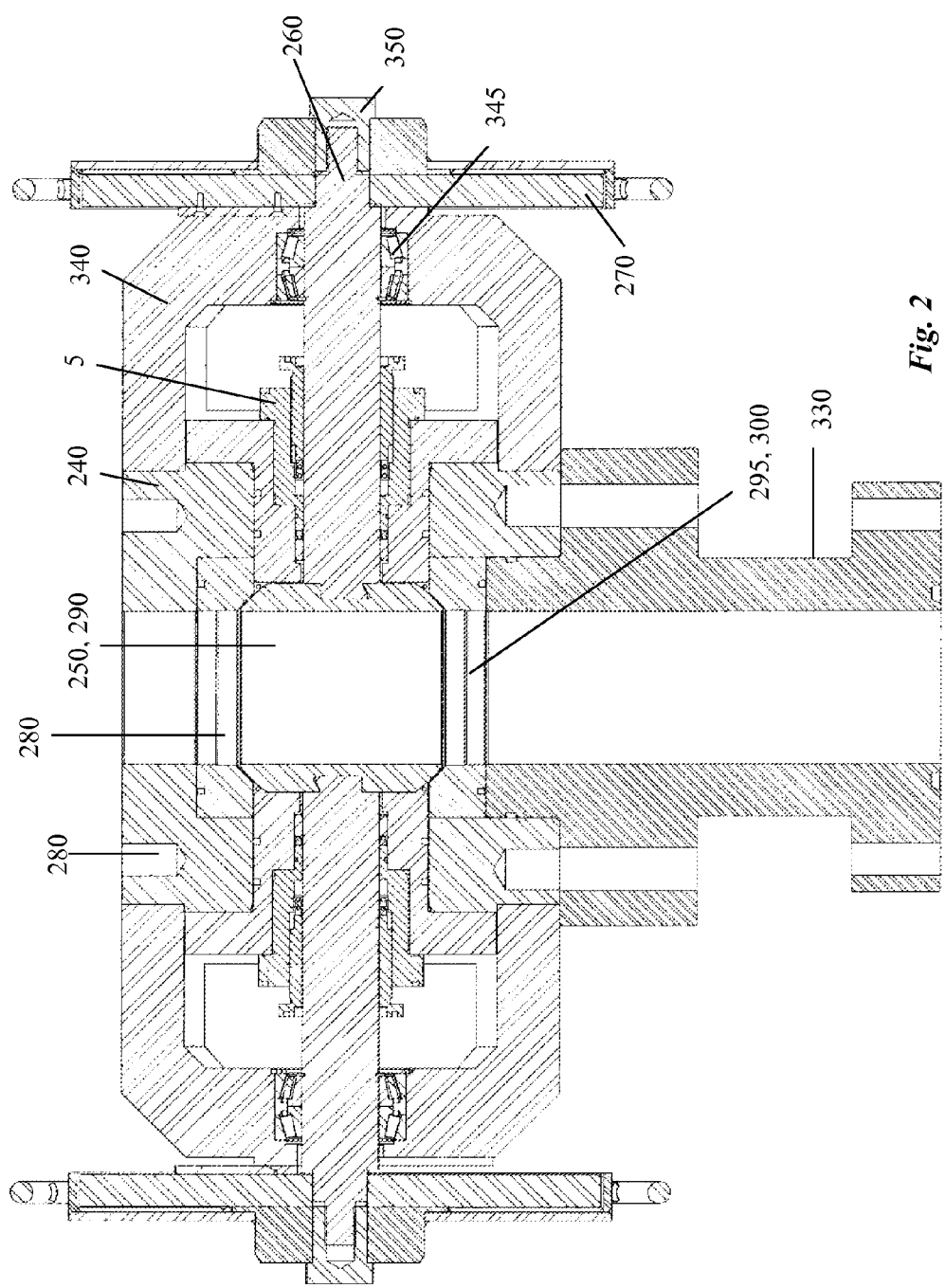
FIG. 2 is a cut away illustration of the ball valve of the present invention.

Now, referring to FIG. 2, which is a cut away illustration of the ball valve of the present invention, the trunnion bonnet and packing retainer configuration 5 sits within the ball valve body 240 such that the proximal end of the trunnion bonnet and packing retainer configuration 5 abuts the ball 250 of the ball valve. As further seen in FIG. 2, the trunnion 260 extends from the ball 250 into the trunnion bonnet and packing retainer configuration 5 and out of the trunnion bonnet and packing retainer configuration 5 in a distal direction. As further depicted in FIG. 2, the trunnion 260 is attached at its proximal end to the ball 250 via a trunnion wedge 260 with a distal edge facing outward at its most distal end, the trunnion wedge 260 fitting within a trunnion notch 270 on the ball 250.

Further, regarding the ball 250, the ball is seated so as to abut two ball valve seats 280. The ball valve seats as depicted in FIG. 2 are parallel to the throughbore of the ball 290 and least partially comprise the throughbore 290 such that fluid flows through the throughbore 290 portion of the ball valve seats and through the ball 250. Further regarding the ball valve seats 280, as depicted in FIG. 2, the ball valve seats 280 ball valve possess ball valve seat sealing grooves 295 circumscribing the throughbore 290 and adapted to receive ball valve seat seals 300 such as O-rings or polypack seals.

Regarding embodiments discussing the ball valve body, distal to the ball valve seats, or otherwise away from the ball 250 is the ball valve body 240. As depicted in FIG. 2, the ball valve body 240 may comprise two throughbore 290 areas such that when aligned with the ball 250, fluid is able to flow through the ball 250, the throughbores 290 of the ball valve seats 280 and through the throughbores 290 of the ball valve body 240 and into to pipe. As seen in FIG. 2, the ball valve body is made of two more pieces which are bolted or welded together after installation of the ball 250 and the ball valve seats 280. The distal side of the ball valve body according to FIG. 2 possesses ball valve body threaded bores 320 adapted to threaded bolts such that pipe flanges 330 may be bolted to the valve body.

Further depicted in FIG. 2, the trunnion 260 passes through the trunnion bonnet and packing retainer configuration 5 and into the ball valve yoke 340. The ball valve yoke 340 supports the trunnion and its mounting to the turnwheel 270, which sits perpendicular to the trunnion 260 axis. Further, to facilitate turning the turnwheel 270, the ball valve yoke 340 has roller bearings 345 within the yoke. As can also be seen in FIG. 2, the distal end of the trunnion 260 is capped by an end cap 350, holding the turnwheel 270 in place.

Figure 3:
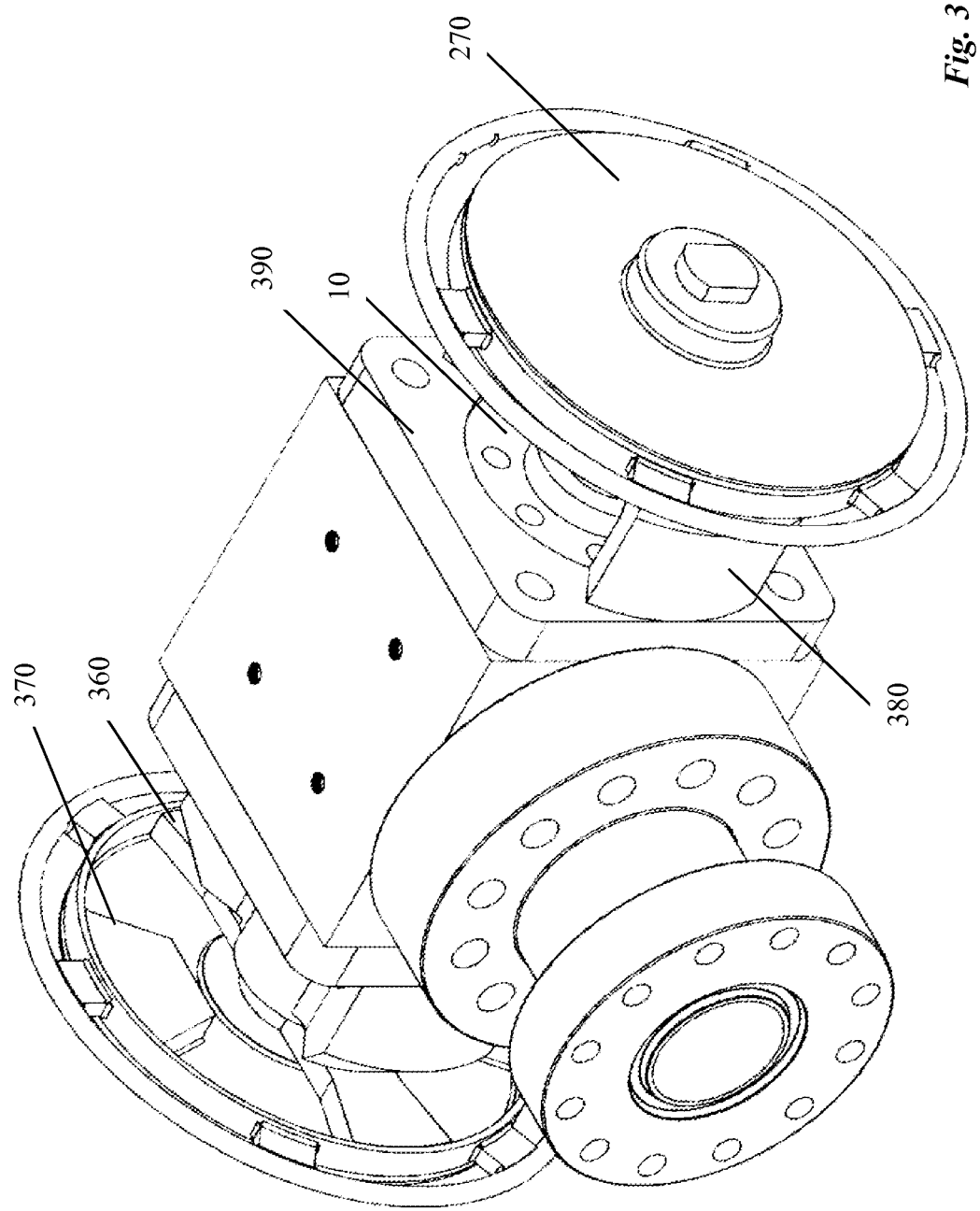
FIG. 3 is an external illustration of the ball valve of the present invention.

FIG. 3 is an external illustration of the ball valve of the present invention. As can be seen, the turnwheels 270 are impactor turnwheels with a hammer 360 and strike zone 370 as seen on the proximal side of the turnwheels 270. Further, as can be seen in the illustration of the invention in FIG. 3, the ball valve yoke 340 comprises yoke arms 380 and a yoke mounting plate 390.

Further, as seen within the yoke mounting plate is the trunnion bonnet 10, which is bolted to the ball valve body. Still further, as can be seen from the external illustration of FIG. 3, the ball valve is attached to pipeline through the use of pipe flanges 330 along a flow axis 400.

Implementation

In implementation, a user can open or close the ball valve by providing torque on the trunnion 260. In such implementation, the user can quickly rotate the turnwheel 270 such that the hammer 360 of the turnwheel impacts the strike zone 370, thus causing increased trunnion torque and opening or closing of the ball valve. During hydraulic fracturing operations or other operations which involve the transit of fluids under high pressure, there is a risk that the pressure may divert some fluid away from the throughbore 290 such that the fluid attempts to escape from the trunnion bonnet 10. If the trunnion bonnet u-pack seal 30 or the trunnion bonnet polypack seal 40 fail, hydraulic fluid will fill the weep notch 80 of the trunnion bonnet 10 and seep out of the weep bore 90. This will inform the user that the seals are starting to fail and thus the seals of the outer packing retainer 50 and the inner packing retainer 140 should be changed. Because of a dual packing retainer system, failure of the first set of seals will not result in failure of the high pressure ball valve. Thus, the ball valve may be able to finish its high pressure applications and then be fixed. In order to replace the seals, the yoke mounting plate 390 and the end cap 350 may be removed from the ball valve. The turnwheel of the side of the ball valve with the leak may be removed and the yoke mounting plate and the yoke 340 may be removed. Next, a wrench may be used to turn the flat retainer lip edges 200 of the inner packing retainer 140 and the outer packing retainer 50. The seals may then be replaced and the ball valve reassembled.

The invention claimed is:

1. A ball valve comprising:
 a. a ball valve body having a first valve bore and a second valve bore;
 b. a ball situated within the ball valve body, said ball comprising a throughbore defining a flow axis;
 c. a first trunnion bonnet with a proximal end oriented toward the ball and a distal end oriented away from the ball, the trunnion bonnet further defining a trunnion axis perpendicular to the flow axis;
 d. an outer packing retainer having a proximal end and a distal end, the outer packing retainer adapted to be received by the first trunnion bonnet, an annular space being formed between the outer surface of the outer packing retainer and an inner surface of the first trunnion bonnet;
 e. an inner packing retainer having a proximal end and a distal end, the inner packing retainer adapted to be received by the outer packing retainer, an annulus being formed between the inner surface of the outer packing retainer and the outer surface of the inner packing retainer;
 f. a first sealing system between the proximal end of the trunnion bonnet and positioned proximally to the outer packing retainer, wherein the first sealing system comprises a U-pack seal and a polypack seal in stacked relationship to one another;
 g. a second sealing system between the proximal end of the outer packing retainer and the proximal end of the inner packing retainer, wherein the second sealing system comprises two polypack seals in stacked relationship to one another;
 h. a trunnion with a proximal end abutting the ball and extending distally from the ball through each of the trunnion bonnet, the first sealing system, the outer packing retainer, the second sealing system and the inner packing retainer, the trunnion further having a distal end connected to a turnwheel; and
 wherein the first sealing system prevents fluid from escaping from the ball valve, and wherein if the first sealing system fails, the second sealing system prevents fluid from escaping from the ball valve.

2. The ball valve of claim 1, wherein the ball valve has, on the opposite side of the ball and aligned with the trunnion axis, another trunnion bonnet, another outer packing retainer, another inner packing retainer, another first sealing system, another second sealing system, another trunnion and another turnwheel.

3. The ball valve of claim 1, wherein the outer packing retainer is threaded into the trunnion bonnet.

4. The ball valve of claim 1, wherein the inner packing retainer is threaded into the outer packing retainer.

5. The ball valve of claim 1, wherein the distal end of the trunnion passes through a ball valve yoke.

6. The ball valve of claim 1, wherein the turnwheel is an impact turnwheel.

7. The ball valve of claim 1, further comprising two ball valve seats with throughbore positioned on opposite sides of the ball and aligned with the flow axis.

8. The ball valve of claim 7, wherein the ball valve seats possess ball valve seat seals aligned with the flow axis.

9. A method of detecting seal failure in a ball valve comprising:
 a. obtaining the ball valve of claim 1;
 b. installing an outer packing retainer with a weep notch in fluid connection to a weep bore, the weep notch positioned between the first sealing system and the second sealing system, and the weep bore exiting the trunnion bonnet;
 c. attaching a pipe to the first valve bore and the second valve bore;
 d. pushing a fluid under a pressure greater than atmospheric pressure through the throughbore; and
 wherein if fluid is leaking from the weep bore, the first sealing system has failed.

10. The method of claim 9, wherein the first sealing system is replaced, the method further comprising:
 a. closing off the ball valve to fluid pressure;
 b. removing the handwheel from the distal end of the trunnion;
 c. unscrewing the inner packing retainer and removing the inner packing retainer from the trunnion by sliding the inner packing retainer in a distal direction until the inner packing retainer disassociates from the trunnion;

d. unscrewing the outer packing retainer and removing the outer packing retainer from the trunnion by sliding the outer packing retainer in a distal direction until the outer packing retainer disassociates from the trunnion;
e. removing the first sealing system and replacing the first sealing system with new seals; and
f. repeating steps a through d in reverse.

* * * * *